Feb. 21, 1967 A. K. SIMONS ETAL Re. 26,162

VEHICLE SEAT REBOUND CONTROL

Original Filed May 8, 1959

2 Sheets-Sheet 1

INVENTORS
ALLISON K. SIMONS
ARTHUR O. RADKE
HARVEY N. TENGLER

BY Bayard H. Michael
ATTORNEY

VEHICLE SEAT REBOUND CONTROL

Original Filed May 8, 1959 2 Sheets-Sheet 2

INVENTORS
ALLISON K. SIMONS
ARTHUR O. RADKE
HARVEY N. TENGLER
BY Bayard H Michael
ATTORNEY United States Patent Office Re. 26,162

Reissued Feb. 21, 1967

26,162

VEHICLE SEAT REBOUND CONTROL

Allison K. Simons, West Byfleet, England, and Arthur O. Radke, Wauwatosa, and Harvey N. Tengler, New Berlin, Wis., assignors to Bostrom Corporation, Milwaukee, Wis., a corporation of Wisconsin Original No. 3,061,260, dated Oct. 30, 1962, Ser. No. 811,995, May 8, 1959. Application for reissue May 20, 1963, Ser. No. 282,202

13 Claims. (Cl. 248—400)

Matter enclosed in heavy brackets [ ] appears in the original patent but forms no part of this reissue specification; matter printed in italics indicates the additions made by reissue.

This invention relates to a seat suspension system and more particularly to a seat shock absorbing system for rough riding vehicles.

The design of a seat for a rough riding vehicle that is subject to intermittent, abnormally rough riding conditions presents special problems. The main springs in such vehicles are necessarily stronger and therefore produce relatively high frequency vibrations when the vehicle is driven on rough roads. Under these conditions the driver is subjected to severe bouncing and full control of the vehicle is difficult, if not impossible, until the speed of the vehicle has been reduced or the road condition has been passed. This condition was formerly corrected by utilizing a separate seat suspension to damp and reduce the frequency of the vibrations transmitted to the seat from the main springs so that the driver would not be subjected to high frequency and high amplitude vibration and thus provide a relatively smooth ride. These seat suspensions were designed for a relatively rough operation but where a severe road condition was encountered the amplitude of vibration of the seat suspension system was increased to such an extent that the seat would either bottom, or bounce the driver up off of the seat, jarring him to such an extent that he was unable to maintain proper control of the vehicle. There has been a growing appreciation of this problem of providing proper seating for drivers to reduce driver fatigue caused by excessive vibrating and unexpected jolts encountered under rough road conditions and to maintain proper control of the vehicle. A solution to this problem has been found by providing a shock absorbing system within the seat suspension system which does not become active until an extremely rough road condition is encountered. With such a shock absorbing system, the suspension system is effectively damped and the driver is relieved from excessive bouncing and retains full control of his vehicle under all road conditions. Once the condition has been passed, the shock absorber may be disconnected from the suspension system by a manual release thus returning the seat to normal suspension operation and giving a smooth ride from the suspension system alone.

The primary object of this invention is to provide a seat suspension system which will effectively cushion undue rebound from extremely rough road conditions.

A further object of this invention is to provide a hydraulic shock absorber system for a seat to effectively damp the seat suspension system by automatically adding the shock absorbing system to the suspension system upon hitting an extremely rough road condition.

A still further object of the present invention is to provide a shock absorbing system which can be added to present seat suspension systems at a minimum of cost.

A final object of this invention is to provide a shock absorbing system for seats which operates only when an extremely rough road condition is encountered.

Other objects and advantages will be pointed out in, or be apparent from, the specification and claims, as will obvious modifications of the single embodiment shown in the drawings in which:

Figure 1:
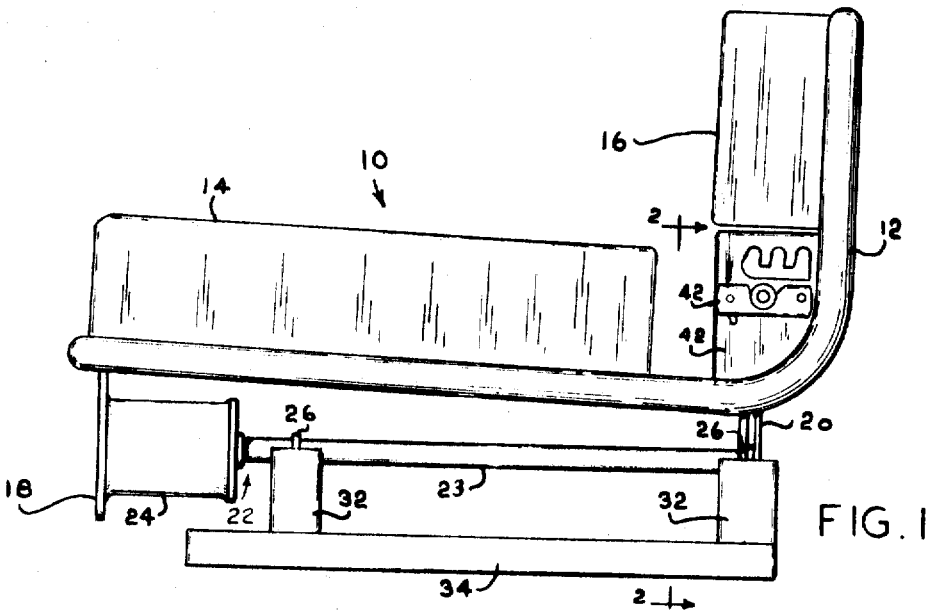
FIGURE 1 is a side elevation of a seat structure embodying the present invention and shown mounted on a supporting or base part.
Figure 2:
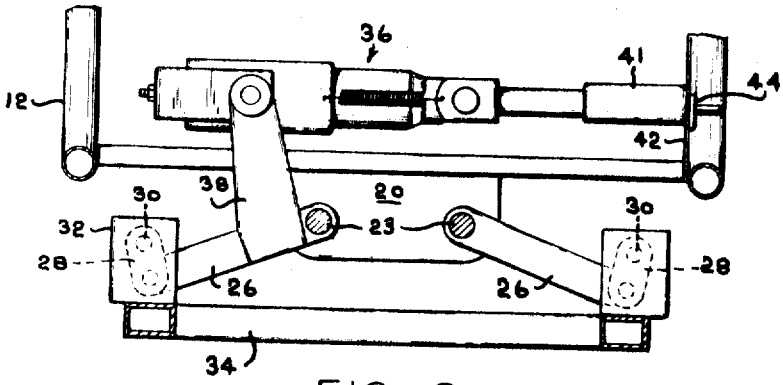
FIGURE 2 is a vertical section taken on line 2—2 in FIGURE 1 showing the suspension system in the normal position with the shock absorber detached.
Figure 3:
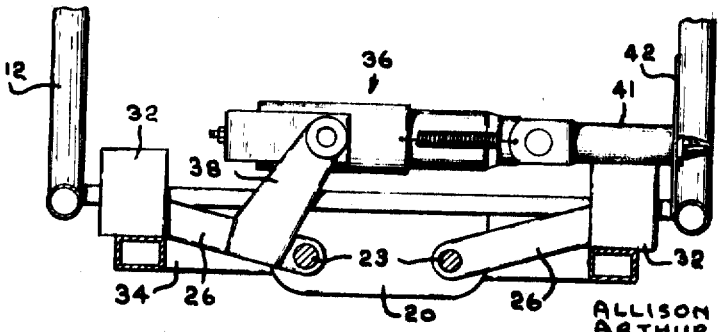
FIGURE 3 is a vertical section similar to FIGURE 2 showing the suspension system in the depressed position and the shock absorber in its operative position.
Figure 4:
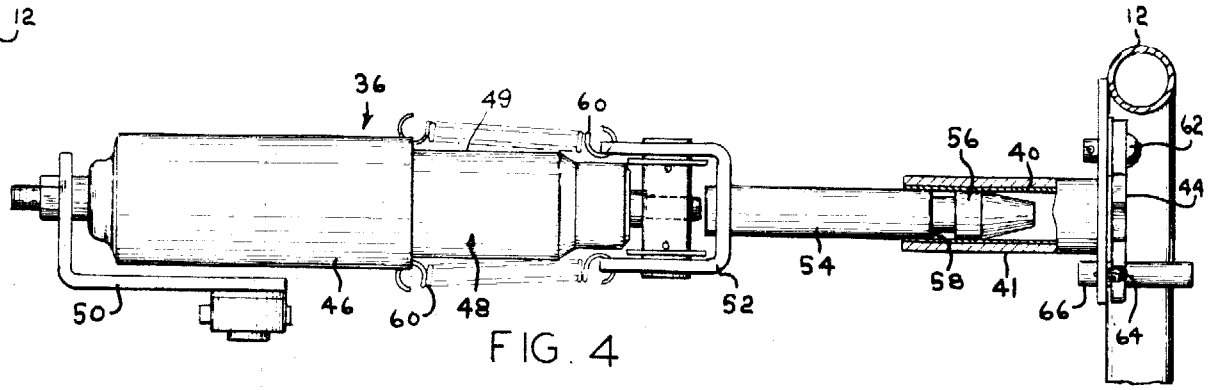
FIGURE 4 is a top view partly in section showing the shock absorbing system disconnected.
Figure 5:
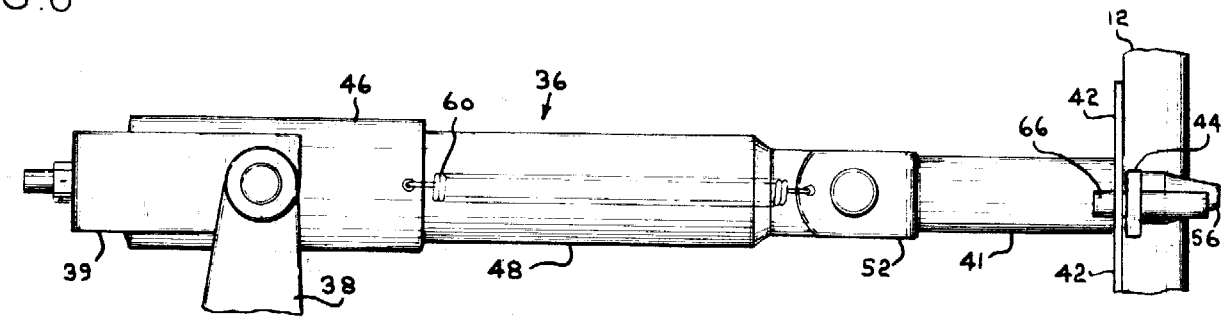
FIGURE 5 is a side elevation of the shock absorber in the operative position.

Referring now to the drawings in detail, there is shown a seat 10 having a frame 12 made of tubing and supporting a seat cushion 14 and a back cushion 16. The frame 12 has a front plate 18 and a rear plate 20 between which a torsion suspension system 22 is mounted. The torsion suspension system 22 includes [rod] *rods* 23 and rubber torsion spring 24, the rods 23 being journaled in the rear plate 20 and connected to springs 24 which are mounted on the front plate 18. A pair of crank arms 26 are rigidly secured to each torsion rod 23 and extend outwardly therefrom to pivotally engage links 28. It will be noted that each crank arm 26 inclines downwardly to a degree and this angularity is compensated for by the links 28 which are connected to bearings 30 mounted in bearing housings 32 on base frame 34. In operation, downward movement of the seat 10 produces a torque through crank arms 26 on rods 23 and springs 24. The torque thus set up will return the seat to a normal position. When the seat moves downward at a rate faster than can be compensated for by the torsion system the seat would normally bottom and jar the driver.

Figure 6:
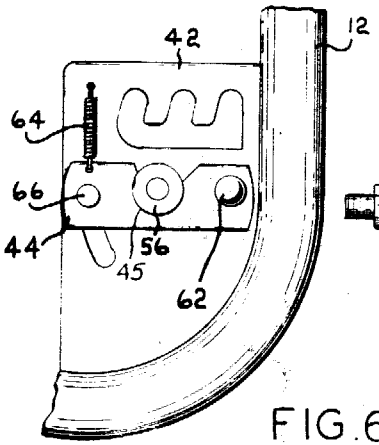
FIGURE 6 is a detail view of the shock absorber latch.

A shock absorber 36 is suspended under the back cushion 16 and includes a cylinder 46 and a piston assembly 48 that is slidable within the cylinder. The cylinder is connected to one of the crank arms 26 by an arm 38 and a bracket 50. The piston assembly includes a piston 49, a yoke 52 and a connector 54 which slides in a bearing 40 in housing 41. The connector has a frustoconical nose cone 56 and a groove 58 located immediately behind the nose. The housing 41 is mounted on a side plate 42 which has an aperture 45 located therein. On the side of the plate remote from the housing a spring biased latch 44 is mounted, FIGURE 6, immediately adjacent aperture 45. The latch is pivoted at 62 and is biased to a lock position by a spring 64 so that it overlaps aperture 45.

The shock absorber 36 floats in the bearing in response to movements of the crank arm 26. Whenever sufficient travel is imparted to the shock absorber, the nose 56 of the connector will force the latch open against the bias of the spring 64 and when the groove 58 is opposite the latch, the spring will snap the latch into the groove. The shock absorber will then be operative to damp the amplitude of vibration of the suspension system. When the rough condition has passed the driver need only depress handle 66 to free the connector 54. The springs 60 will draw the piston within the cylinder for free riding operation.

Although but one embodiment of the present invention has been illustrated and described, it will be apparent to those skilled in the art that various changes and modifications may be made therein without departing from the spirit of the invention or from the scope of the appended claims.

We claim:

1. A seat structure having a seat part and a base part, means for resiliently suspending the seat part from the base part for vibratory movement with respect thereto, damping means mounted for operative connection between said seat part and said base part, but normally inoperative to influence the relative vibratory movement therebetween, and means automatically responsive to predetermined amplitude of vibratory movement between said parts to operatively connect said damping means to and between said parts to render the damping means operative to dampen vibratory movements between said parts.

2. The combination with a seat structure having a seat part, a base part and means for suspending said seat part on said base part, a damping system comprising, a damper having relatively moveable members, means for connecting one member of the damper to the suspension means, means for slidably connecting the other member of the damper to one of said parts so that the damper has no influence on the suspension system, means on said one of said parts for operatively locking the damper to said one part so that the damper dissipates the energy and reduces the motion of the suspension system and means for disengaging the locking means from the damper.

3. The combination according to claim 2 in which the connecting means for the other member and said one of said parts comprises a sleeve bearing mounted in a bearing housing which is secured to said one of said parts, and said other member slidably engages the bearing.

4. A seat structure comprising a seat and a frame, a torsion suspension means for mounting said seat on said frame for relative vibratory movement, a damping means inoperatively secured to the suspension system and normally ineffective to influence relative vibratory movement of said parts, locking means responsive to predetermined amplitude of vibratory movement between said parts to automatically and releasably connect the damping means to said suspension system and render the same effective to absorb and cushion the vibratory movements of said parts, and means for releasing said locking means to restore the damping means to normal, ineffective condition.

5. A shock absorber for a seat having a torsion suspension system, comprising a cylinder, a piston assembly including a piston and a connecting rod reciprocally engaging the cylinder, means for connecting said cylinder to the suspension system, means for connecting the piston assembly to the seat, said last mentioned connecting means including a bearing secured to the seat so that the connecting rod slidably engages said bearing, said connecting rod having a locking groove and a frusto-conical nose cone, and means on the seat for engaging the groove in response to a condition so that the shock absorber is operatively locked to the suspension system.

6. A shock absorbing system for a seat structure comprising a cylinder, a piston assembly slidably engaging said cylinder, a seat, a frame, means for suspending said seat on said frame, means for connecting the cylinder to said suspension means so that it responds to the movements of said suspension means, means for slidably connecting the piston to the seat, said seat including a latch adjacent said slidable means, means biasing the latch into engagement with the slidable means, means on said piston for engaging said latch in response to a condition whereby said cylinder and piston effectively damp the motion of the suspension system.

*7. In combination, a pedestal, a seat, a torsion spring suspension mounting the seat on the pedestal for oscillating movement of the seat relative to the pedestal, said suspension including shock absorbing means adapted to be rendered in effective and ineffective conditions for damping the oscillating movement of the seat, and means operable by a person sitting on the seat to change the shock absorbing means from one condition to the other.*

*8. In combination, a seat, a seat suspension having a base frame, a seat-support in spaced relation to the base frame and upon which the seat is mounted, means including an arm joining the base frame and seat support for permitting oscillating movement of the seat and seat-support relative to said base frame, torsion spring means energized by the arm upon movement of the seat and seat-support, shock-absorbing means adapted to be rendered in effective and ineffective conditions for damping the oscillating movement of the seat and seat-support, and means operable by a person sitting on the seat to change the shock-absorbing means from one condition to the other.*

*9. In combination, a resilient seat suspension having a seat-support and means mounting the seat-support for oscillating movement in a path, a seat carried by said seat-support and movable therewith, said suspension also including shock-absorbing means adapted to be rendered in effective and ineffective conditions for damping the oscillating movement of the seat and seat-support, and means operable by a person sitting on said seat to change the shock absorbing means from one condition to the other.*

*10. A vehicle seat assembly comprising a seat part and a base part means joining the base and seat part for permitting oscillating movement of the seat part relative to the base part, the means including spring means and damping means with said spring and damping means providing different natural frequencies for the seat part, said damping means including a cylinder member and a piston member slidably engaged with said cylinder member with said two members being operable to yieldingly resist and damp relative sliding movement between said members, one of said members being connected to one of said parts and the other of said members being connected to said other of said parts for relative movement in respect thereto so as to avoid relative movement between said members during said oscillatory movement and thus render said damping means ineffective for damping said oscillating movement, restraining means to prevent said relative movement between said other of said members and said other of said parts and thereby cause relative movement between said members during said oscillating movement and thus render said damping means in an effective condition and means operable by a person sitting on the seat for actuating said restraining means and altering the effectiveness of the damping means independently of the spring means to change the natural frequency of the seat.*

*11. A seat suspension having a seat-support part and a base frame part, and means joining the seat-support part and base frame part for permitting oscillating movement of the seat-support part relative to said base frame part; said means including spring means and damping means, the natural frequency of the seat-support when subjected to the action of both the spring and damping means being different from its natural frequency when subjected to the action of only the spring means, said damping means including a cylinder member and a piston member slidably engaged with said cylinder member with said two members being operable to yieldingly resist and damp relative sliding movement between said members, one of said members being pivotally connected to one of said parts and the other of said members being connected to said other of said parts for relative movement in respect thereto so as to avoid relative movement between said members during said oscillatory movement and thus render said damping means ineffective for damping said oscillating movement, restraining means to prevent said relative movement between said other of said members and said other of said parts and thereby cause relative movement between said members during said oscillating movement and thus render said damping means in an effective condition, and means for actuating said restraining means and thus rendering effective and ineffective the*

*damping action of the damping means independently of the spring means.*

*12. In combination, a seat part and a base part upon which the seat is mounted, and means joining the base and seat parts for permitting oscillating movement of the seat part relative to the base part; said means including spring and damping means, the natural frequency of the seat when subjected to the action of both the spring and damping means being different from its natural frequency when subjected to the action of only the spring means, and means for rendering effective and ineffective the damping action of the damping means independently of the damping action of said spring means.*

*13. In combination, a seat and a base upon which the seat is mounted, and means joining the base and seat for permitting oscillating movement of the seat relative to the base; said means including spring and damping means, the natural frequency of the seat when subjected to the action of the spring and damping means being different from*

*its natural frequency when subjected to the action of only the means, and means operable by a person sitting on the seat to render ineffective the damping action of the damping means.*

References Cited by the Examiner

The following references, cited by the Examiner, are of record in the patented file of this patent or the original patent.

UNITED STATES PATENTS

| | | | |
|---|---|---|---|
| 2,144,583 | 1/1939 | Focht | 188—100 |
| 2,516,801 | 7/1950 | Renaud | 248—401 |
| 2,606,592 | 8/1952 | McIntyre | 248—374 |
| 2,678,704 | 5/1954 | Campeau | 188—100 |
| 2,682,295 | 6/1954 | Hickman | 297—308 |

CLAUDE A. LE ROY, *Primary Examiner.*

N. F. MARTIN, *Examiner.*